United States Patent [19]

Soroka et al.

[11] Patent Number: 5,113,558
[45] Date of Patent: May 19, 1992

[54] BED COOLER AND CHIP FLUSHER FOR A MACHINE TOOL

[75] Inventors: Daniel P. Soroka, Horseheads; Terrence M. Sheehan, Elmira, both of N.Y.; Gary L. Comstock, Gillett, Pa.; Glenn E. Greenall, Horseheads, N.Y.

[73] Assignee: Hardinge Brothers, Inc., Elmira, N.Y.

[21] Appl. No.: 732,105

[22] Filed: Jul. 18, 1991

[51] Int. Cl.[5] .................. B23Q 11/10; B24B 55/02
[52] U.S. Cl. ........................... 29/57; 51/266; 82/901; 184/6.14; 408/56; 409/137
[58] Field of Search ............... 409/136, 137, 253, 135, 409/294; 384/15; 29/57, DIG. 87, DIG. 88, DIG. 101, DIG. 94, DIG. 91, DIG. 50; 184/614, 81, 74, 6.27; 408/56, 60; 82/121, 152, 900, 901; 51/266, 267

[56] References Cited

U.S. PATENT DOCUMENTS

| | | | |
|---|---|---|---|
| 1,120,807 | 12/1914 | Goetz et al. | 184/6.14 |
| 1,211,840 | 1/1917 | Hanson | 82/17 X |
| 2,301,069 | 11/1942 | Mulholland | 29/DIG. 91 |
| 2,652,737 | 9/1953 | Longstreet | 29/DIG. 91 |
| 2,745,318 | 11/1950 | Williams | 409/136 |
| 3,071,918 | 1/1963 | Hofstetter | 82/900 X |
| 4,026,143 | 5/1977 | Holland | 409/137 |
| 4,197,678 | 4/1980 | Roll et al. | 51/267 |
| 4,523,360 | 6/1985 | Giovanola | 409/137 |

*Primary Examiner*—William Briggs
*Attorney, Agent, or Firm*—Shlesinger Arkwright & Garvey

[57] ABSTRACT

A chip flushing apparatus for connection to a machine tool for flushing chips of debris from cutting operations performed by the machine tool. The flushing apparatus includes a header bar having outlet means for dispensing fluid to a chip receiving area of the machine tool for transporting the chips to a recovery box. A fluid flow deflector is positioned near the outlets of the header to deflect the fluid streams into a laminar flow across the fluid receiving area. A removable tank is mounted below the receiving area to receive the flushing fluid. The tank is wheeled for convenient transport.

12 Claims, 3 Drawing Sheets

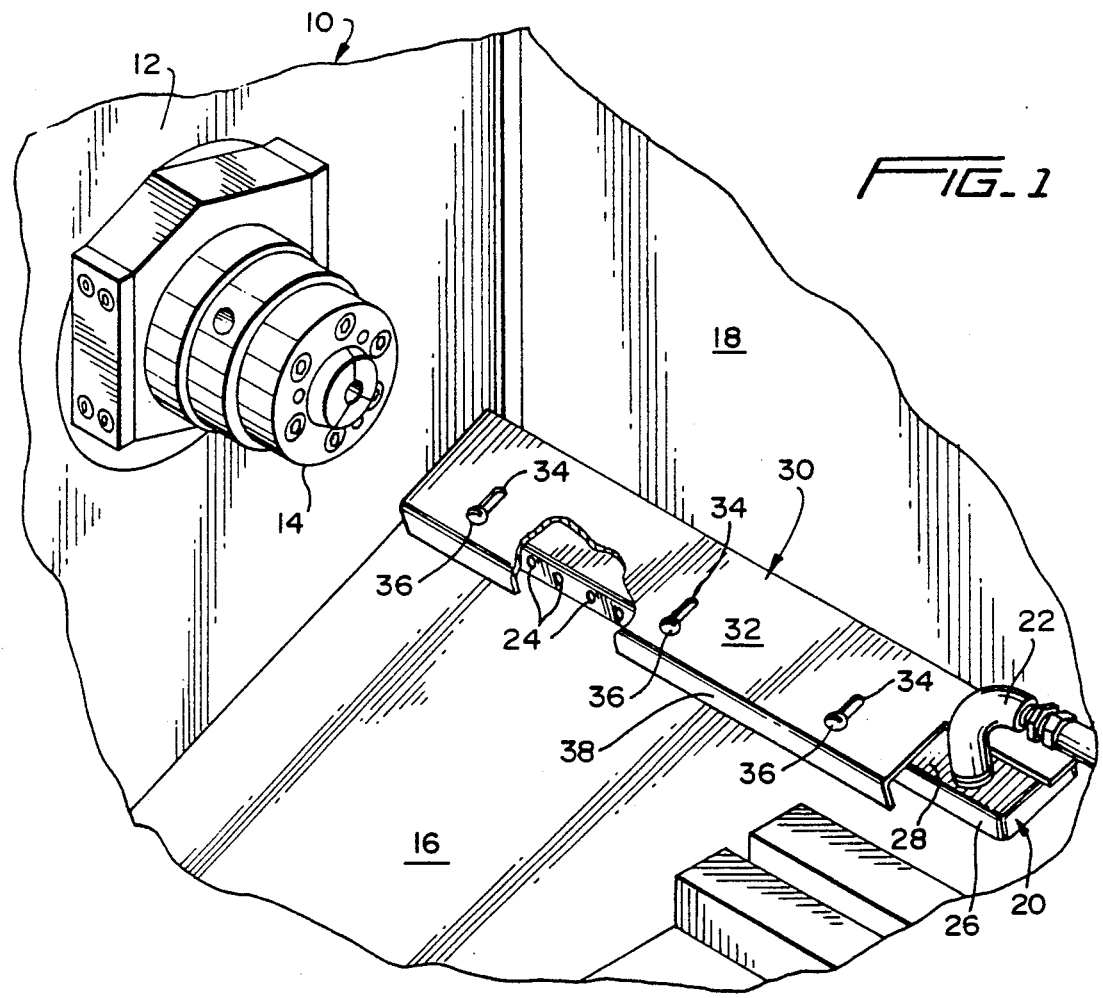
FIG_1
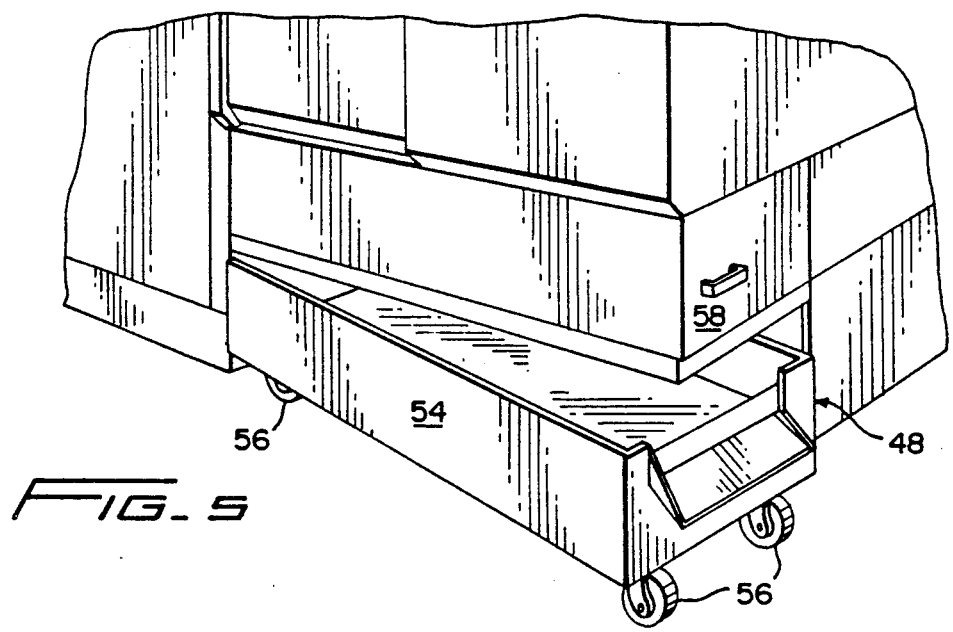
FIG_5

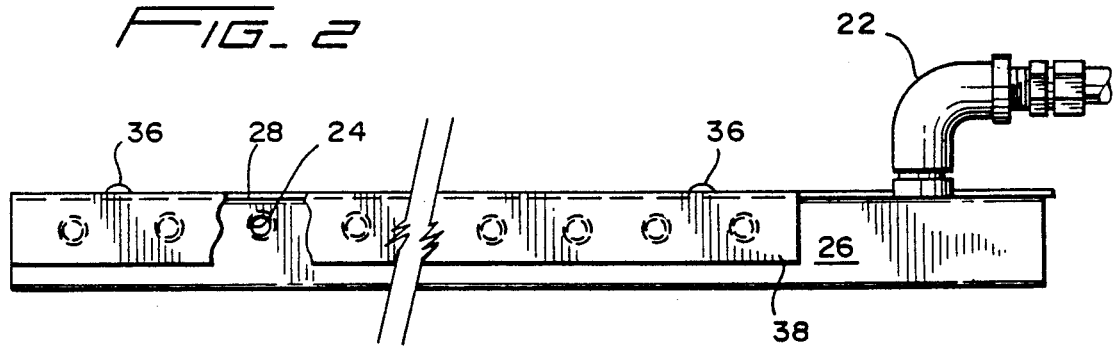
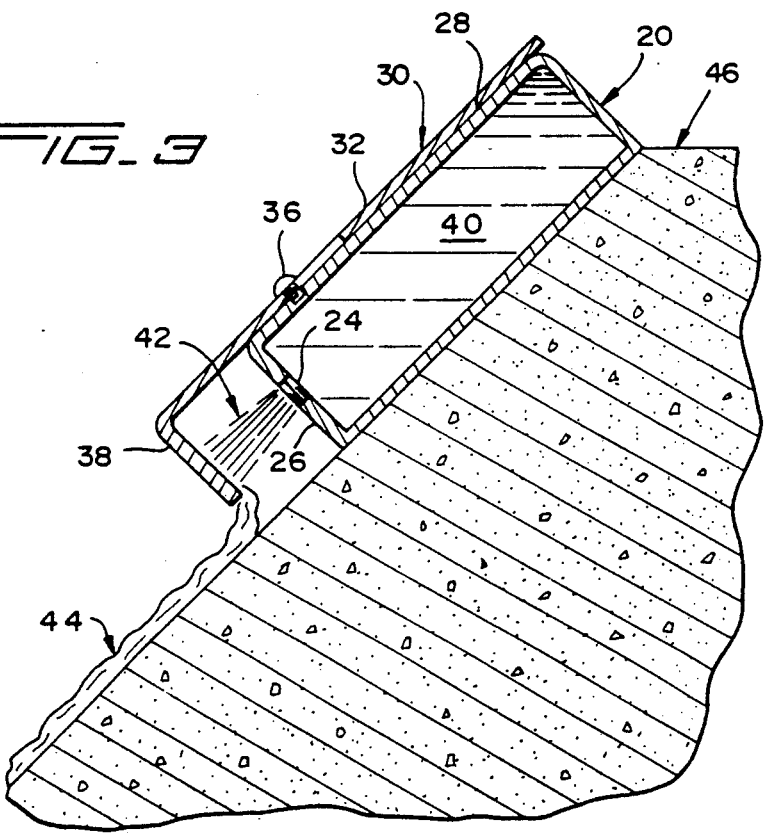

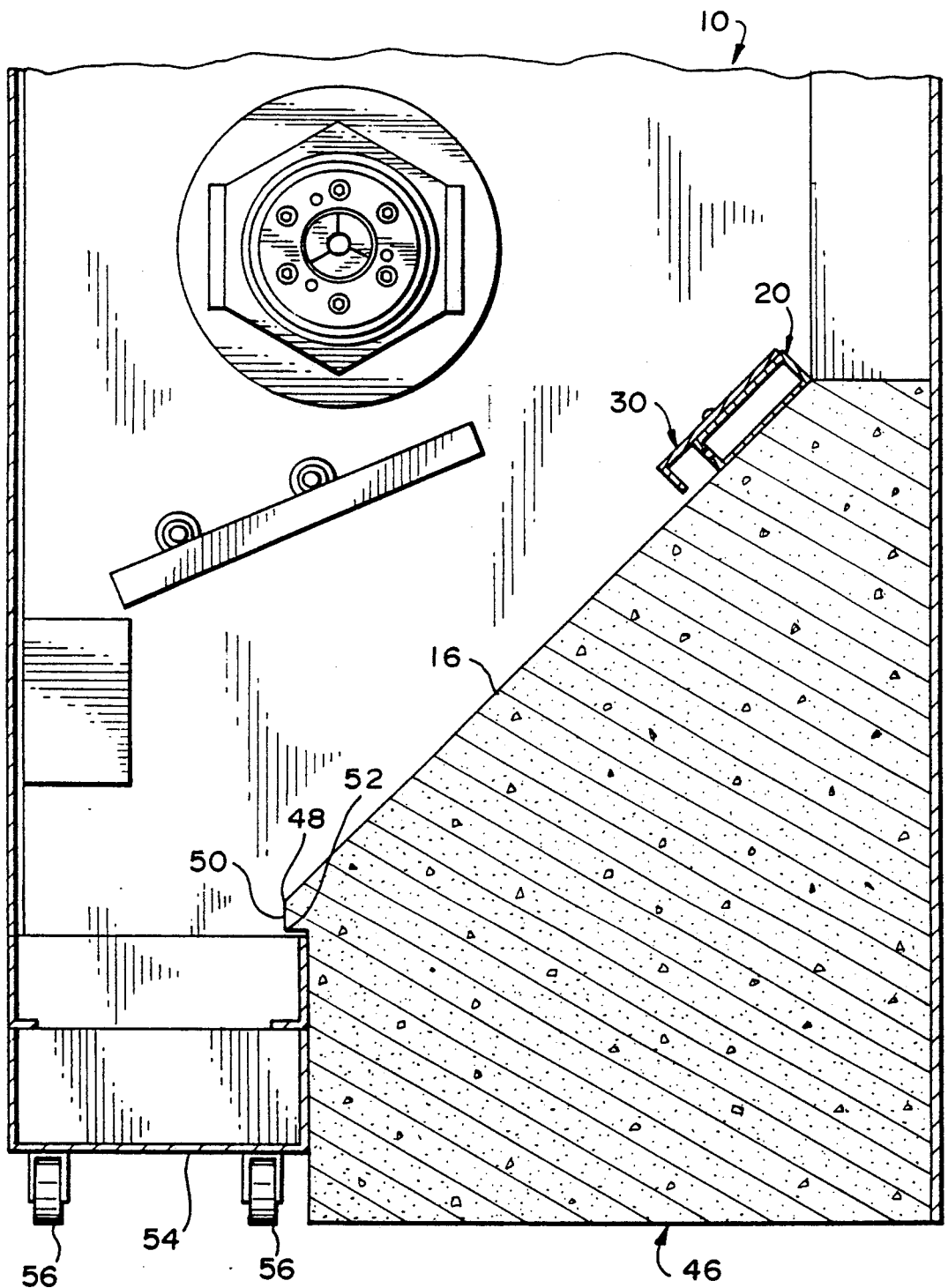
FIG_4

BED COOLER AND CHIP FLUSHER FOR A MACHINE TOOL

FIELD OF THE INVENTION

This invention relates to a machine tool and more particularly to a machine tool having a chip flushing device for removing the tailings from beneath the work area and transporting the chips to a receiving chamber. The chip flusher uses a coolant fluid which also reduces heat build up in the machine tool.

BACKGROUND OF THE INVENTION

Accumulation of chips from machine tool operations has always been a problem in the machine tool field and is more acute with the advent of automated machine tools which operate continuously for extended periods of time. The build up of chips from the cutting operations would interfere with the operation of the machine tool if the chips were not periodically removed.

An early effort to alleviate the problem of build-up included the use of a slanted chip receiving area or way which would allow the accumulated chips to slide downwardly to a chip-receiving container or else down to the floor.

In the field of highly accurate and automated machine tools, the slide alone was not sufficient. It was necessary to develop faster and more thorough chip removal devices to maintain the pace of the machine tool. The U.S. Pat. No. 2,652,737 of Longstreet, incorporated herein by reference, discloses a chip flushing means using a fluid for flushing the beds of the machine tool. The fluid is distributed by a fluid pipe having a series of openings for depositing a flushing fluid onto the machine ways to flush chips away from the cutting area. However, the device of Longstreet produces individual streams from each opening and flushing the way in the path of each stream. While the individual streams flush the channels in which they flow, they do not provide a sufficient flushing capability to remove chips from the entire way. Furthermore, the use of individual stream does not provide a smooth cooling flow across the way to flush away the hot chips and simultaneously cool the bed of the machine base.

In view of the foregoing, it can be seen that there is a need for a chip flushing system which provides a laminar flow of flushing fluid across the chip receiving area and simultaneously cools the chip receiving area to prevent unwanted thermal creep of the machine tool base.

OBJECTS AND SUMMARY OF THE INVENTION

It is an object of the invention to provide a chip flushing system having a laminar flow to remove chips from the chip receiving area of the machine tool.

It is another object of the invention to provide a header in the chip flushing assembly having a plurality of outlets for directly applying flushing fluid onto the chip receiving area of the way.

Yet another object of the invention is to provide plugable openings in the header so that the fluid flow may be interrupted over desired portions of the chip receiving area.

Still another object of the invention is to provide a deflector flange spaced from the outlets of the header to deflect the stream flow from the outlets and convert the stream flow into laminar flow across the chip receiving area.

Yet another object of the invention is to provide a coolant fluid across the chip receiving area for regulating the temperature of the machine tool by removing hot chips from the chip receiving area and by absorbing heat from the machine tool to prevent thermal expansion.

Still another object of the invention is to provide a flushing fluid receiving tank below the chip receiving area so that the flushing fluid may be collected in the tank.

Another object of the invention is to provide a strainer below the chip receiving area so that chips may be strained from the flushing fluid for disposal and cleaning.

Still another object of the invention is to provide a wheeled flushing fluid receiving tank which may be moved from the machine tool.

In summary, this invention is directed to a chip flushing apparatus for a machine tool for providing laminar flow across the chip receiving area to more effectively flush the chips therefrom and simultaneously provide a uniform cooling effect across the machine tool base to prevent heat build up and avoid thermal expansion of the machine tool base. The flushing device includes a fluid supply for delivering a flushing fluid to the chip receiving area of the machine tool. The fluid supply includes at least one fluid outlet adjacent the receiving area for dispensing a stream of fluid to the receiving area. A fluid deflector is mounted adjacent the fluid outlet for converting the stream of fluid flow to a laminar flow. Preferably the outlet includes a header having a series of spaced ports for dispensing individual streams of fluid. The deflector includes a flange for causing the individual streams of fluid to join together in laminar flow. The flushing device includes a fluid tank for recovering the flushing fluid from the receiving area. The flushing device also includes a strainer for removing chips from the flushing fluid. The fluid recovery tank is wheeled for convenient transport.

These and other objects and advantages of the invention will become apparent from the following detailed description and accompanying drawings.

BRIEF DESCRIPTION OF THE DRAWINGS

FIG. 1 is a partial perspective view of the header of the flushing assembly mounted in position on the chip receiving area on a lathe;

FIG. 2 is a front plan view of the header and deflecting flange assembly;

FIG. 3 is a cross-sectional view of the header and flange assembly;

FIG. 4 is a sectional view of one end of a lathe having the chip flushing apparatus installed thereon.

FIG. 5 is a perspective view showing the chip recovery box and the wheeled flushing fluid recovery tank;

DETAILED DESCRIPTION OF THE DRAWINGS

FIG. 1 shows a lathe 10 as an example of a typical machine tool having a headstock 12 having a spindle 14 for holding the stock material to be machined. A machine bed 16 is located below the spindle and provides an inclined slope for receiving chips removed from the stock material during machining operation. A vertical rear wall 18 is located at the high end of the bed 16. Preferably, the flushing assembly header 20 is mounted at the corner of the bed 16 and rear wall 18. The header 20 is preferably bonded adhesively to the bed 16, but may also be fastened thereto by screws, brackets and the like.

A fluid supply hose 22 feeds coolant into the header 20. The coolant is preferably water based and nonflammable. The header 20 includes a plurality of holes 24 preferably evenly spaced along the side wall 26 of header 20. Header 20 also includes a top surface 28 to which is mounted a deflecting flange 30.

The deflecting flange 30 includes a top plate 32 preferably having a plurality of slots 34 formed therein to provide adjustability of the deflecting flange 30 relative to the header side wall 26. Fasteners such as screws 36 join the top plate 32 to the top surface 28 of header 20 and can be selectively tightened and loosened for adjustability of the deflecting plate 38 to position a deflector plate 38 with respect to side wall 26 of header 20 and holes 24. Deflecting plate 38 extends substantially 90° from top plate 32.

Now referring to FIGS. 2 and 3, the header 20 and the deflecting flange 30 are shown in front and side views. In FIG. 2, the vertical location of the holes 24 are shown relative to the top surface 28 of header 20.

FIG. 3 is a cross-sectional view of the header 20 and deflecting flange 30 joined in an operative manner. The figure shows the header 20 having a hollow interior 40 containing the flushing fluid. The figure shows the flushing fluid 42 being expelled through hole 24 and encountering deflecting plate 38 to be spread out and form a laminar sheet 44.

Is should be understood that holes 24 are threaded as shown in FIG. 3 so that the holes 24 may be plugged by a screw (not shown). FIG. 3 shows the typical mounting of the header 20 and deflecting flange 30 on a concrete base 46 such as the Hardinge HARCRETE® brand base.

The laminar sheet 44 provides two functions. First, the sheet covers the entire bed 66 to remove all chips falling on the bed 16. If it is found that only a particular receiving area of the bed 16 needs flushed, some of the holes 24 may be plugged to limit the width of the laminar sheet 44.

Secondly, the flushing fluid which is the same fluid used to cool the part being machined, acts as a coolant on the concrete bed 16 to prevent undesirable thermal expansion due to heat build up in the concrete base 46.

Now referring to FIG. 4, the concrete base 46 forms a sloped bed 16 which ends at a corner 48 with vertical surface 50. The vertical surface 50 is under cut to form a drip edge 52. The drip edge 52 facilitates recovery of the coolant flushing fluid by recovery tank 54.

Recovery tank 54 preferably includes four wheels 56 which facilitate removal of the recovery tank 54 from the lathe 10 for transport to a coolant fluid disposal site.

A strainer box 58 is located above recovery tank 54 for straining which will remove most chips from the flushing fluid. The chips and the flushing fluid may then be recycled.

In operation, the flushing fluid is pumped into the header 20 and streams of fluid 42 as shown in FIG. 3 are sprayed through holes 24. The fluid streams 42 engage deflecting plate 38 and are spread out and forced downwardly into a laminar sheet 44 onto bed 16. Chips falling onto bed 16 are then washed down into straining box 58 and the flushing fluid flows into recovery tank 54.

The laminar flow of fluid across bed 16 cools concrete base 46 and prevents thermal creep of the concrete. Concrete bases are preferably used in machine tools because they tend to absorb vibration better than metals. One problem found with concrete bases however, is that the thermal creep tends to be difficult to estimate, rather than a measurable amount of thermal creep found in metal bases.

In machines with accuracy of two tenthousandths total part variation (on diameter), any thermal creep is undesirable. The use of laminar flow of coolant across the entire bed controls thermal absorbtion of the concrete base and variations of temperature across the bed are eliminated.

While this invention has been described as having a preferred design it is understood that it is capable of further modifications, uses and/or adaptations of the invention following in general the principle of the invention and including such departures from the present disclosure as come within known or customary practice in the art to which the invention pertains, and as may be applied to the central features hereinbefore set forth, and fall within the scope of the invention and the limits of the appended claims.

We claim:

1. A chip flushing device for use with a machine tool, comprising:
    a) fluid supply means for delivering a flushing fluid to a chip receiving area of the machine tool;
    b) said fluid supply means including at least one fluid outlet means adjacent the receiving area for dispensing a stream of fluid to the receiving area; and,
    c) fluid deflection means mounted adjacent said fluid outlet means for converting said stream to a laminar flow of fluid.

2. The chip flushing device as set forth in claim 1, wherein:
    a) said fluid supply means includes a supply hose for delivering a pressurized fluid to said fluid outlet means.

3. The chip flushing device as set forth in claim 1, wherein:
    a) said fluid outlet means includes a header having a series of spaced ports for dispensing individual streams of fluid to the receiving area.

4. The chip flushing device as set forth in claim 3, wherein:
    a) said deflecting means includes a flange for causing said individual streams of fluid to join together in laminar flow.

5. The chip flushing device as set forth in claim 4, wherein:
    a) said flange includes a connecting section and a deflecting section.

6. The chip flushing device as set forth in claim 5, wherein:
    a) said connecting section includes adjustably connected attaching means for joining said deflecting means to said header.

7. The chip flushing device as set forth in claim 1, further comprising:
    a) fluid receiving means for recovering said flushing fluid from said receiving area.

8. The chip flushing device as set forth in claim 7, wherein:
    a) said fluid receiving means includes straining means for removing chips from said flushing fluid.

9. The chip flushing device as set forth in claim 7, wherein:

a) said fluid receiving means includes a fluid recovery tank.

11. The chip flushing device as set forth in claim 9, wherein:
  a) said fluid recovery tank includes wheeling means for facilitating transport of said tank without lifting.

11. The chip flushing device as set forth in claim 1, wherein:
  a) the fluid is a coolant and acts to cool the machine tool as the fluid flows across the chip receiving area.

12. A machine tool having means for holding a workpiece and means for shaping a workpiece during a workpiece shaping operation wherein chips are removed from the workpiece during the shaping operation, the machine tool having means for flushing the chips from the machine tool bed means, comprising:
  a) said bed means located below said holding means and said shaping means forming a receiving area for the chips removed from the workpiece, said receiving area being inclined;
  b) flushing means for removing the chips from the bed means;
  c) said chip flushing means having a header, said header being mounted to said bed means;
  d) said header having outlet means for dispensing flushing fluid in a laminar flow onto said bed means;
  e) said header having a longitudinal axis and extends horizontally along said longitudinal axis and said outlet means is aligned along said longitudinal axis.

* * * * *